(12) United States Patent
    Ollgaard

(10) Patent No.: US 8,747,073 B2
(45) Date of Patent: Jun. 10, 2014

(54) ARRANGEMENT FOR CABLE GUIDING AND A WIND TURBINE USING SUCH ARRANGEMENT

(75) Inventor: Borge Ollgaard, Esbjerg (DK)

(73) Assignee: Vestas Wind Systems A/S, Aarhus N. (DK)

( * ) Notice: Subject to any disclaimer, the term of this patent is extended or adjusted under 35 U.S.C. 154(b) by 773 days.

(21) Appl. No.: 13/060,742

(22) PCT Filed: Aug. 21, 2009

(86) PCT No.: PCT/EP2009/060819
§ 371 (c)(1),
(2), (4) Date: Feb. 25, 2011

(87) PCT Pub. No.: WO2010/023160
PCT Pub. Date: Mar. 4, 2010

(65) Prior Publication Data
US 2011/0155420 A1    Jun. 30, 2011

Related U.S. Application Data

(60) Provisional application No. 61/093,897, filed on Sep. 3, 2008.

(30) Foreign Application Priority Data

Aug. 29, 2008  (DK) .................................. 2008 01201
Nov. 19, 2008  (DK) .................................. 2008 01621

(51) Int. Cl.
    *F03D 7/00*       (2006.01)
(52) U.S. Cl.
    USPC ...................................... 416/244 A

(58) Field of Classification Search
    USPC ...................... 416/244 A, 244 R; 290/44, 55
    See application file for complete search history.

(56) References Cited

U.S. PATENT DOCUMENTS

2004/0094965 A1    5/2004   Kirkegaard et al.

FOREIGN PATENT DOCUMENTS

| CN | 2528138 | 12/2002 |
|----|---------|---------|
| JP | 2005-137097 | 5/2005 |
| JP | 2006-246549 | 9/2006 |
| WO | 2004/035455 | 4/2004 |

OTHER PUBLICATIONS

Stefano Angelucci; International Search Report issued in priority international application No. PCT/EP2009/060819; Dec. 20, 2010; 4 pages; European Patent Office.
Stefano Angelucci; Written Opinion of the International Search Authority issued in priority international application No. PCT/EP2009/060819; Dec. 20, 2010; 7 pages; European Patent Office.

*Primary Examiner* — Edward Look
*Assistant Examiner* — Maxime Adjagbe
(74) *Attorney, Agent, or Firm* — Wood, Herron & Evans, LLP

(57) ABSTRACT

The present invention relates to an arrangement (1) for cable guiding, comprising a first guide member (40) adapted to enclose a first cable (10) along at least a part of the length of said first cable. The first guide member (40) has an outside surface adapted to form at least one first guide surface (41) supporting at least one second cable (20) along at least a part of the length of said first cable. The present invention further relates to a wind turbine comprising such an arrangement and to the use of such an arrangement.

20 Claims, 5 Drawing Sheets

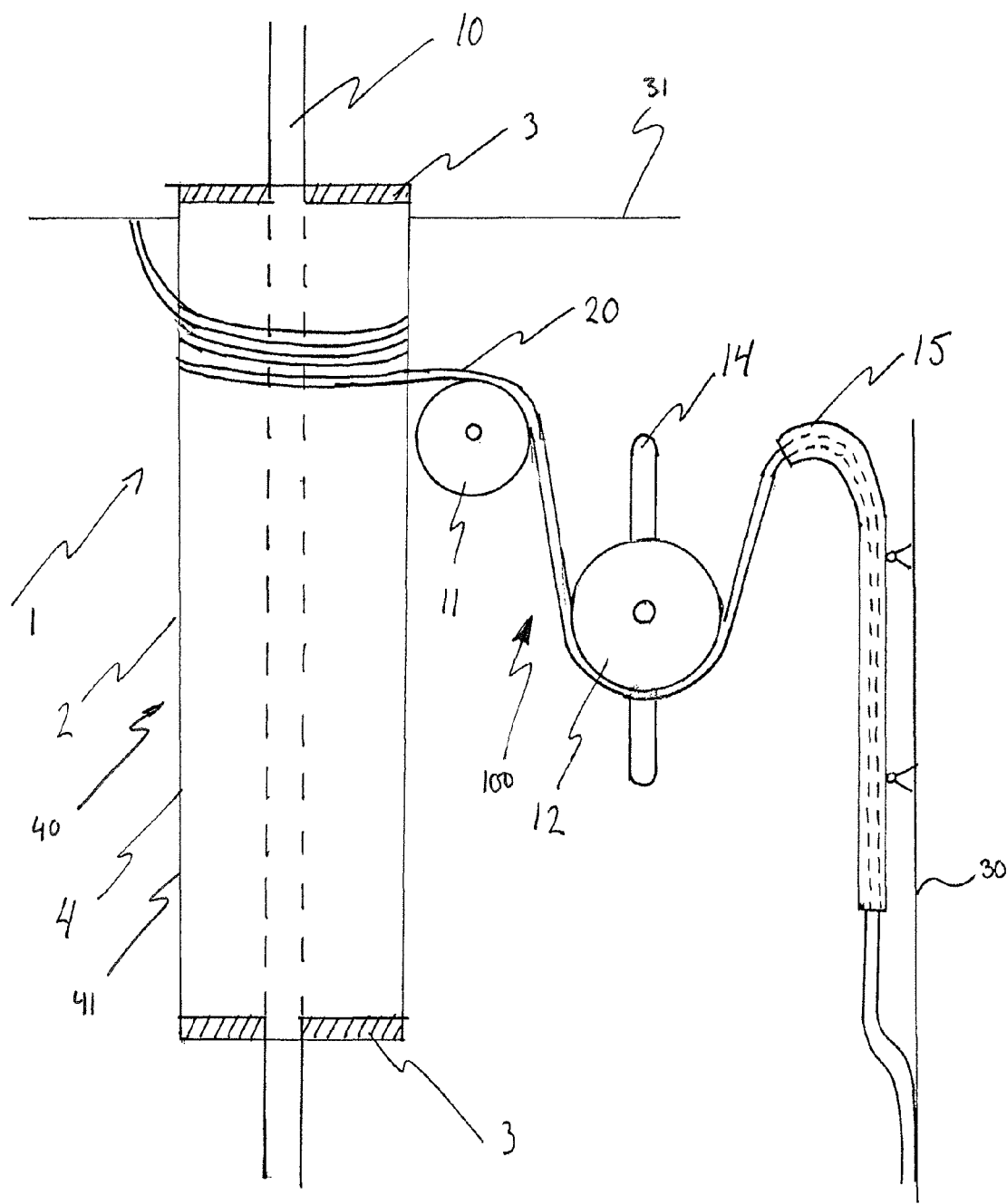

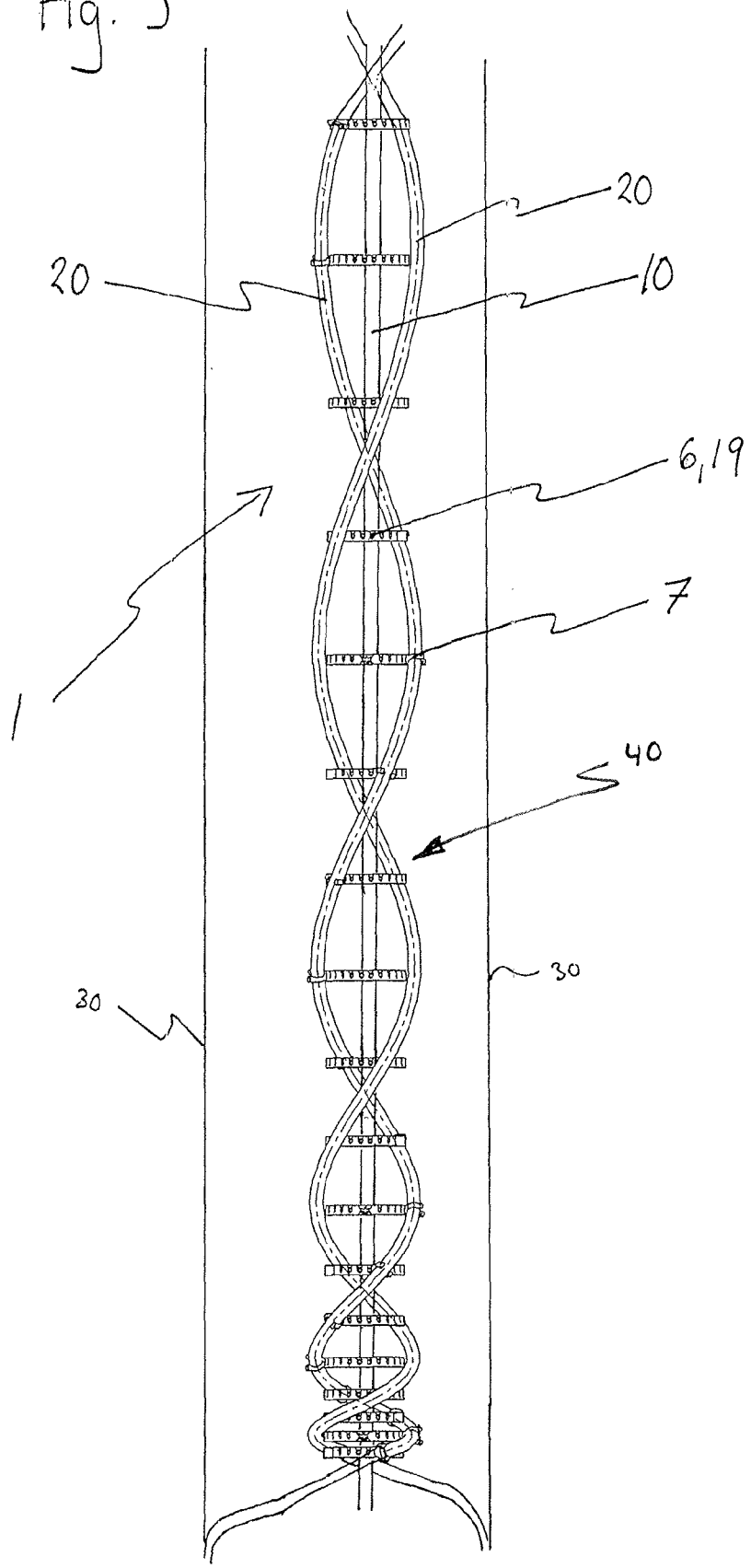

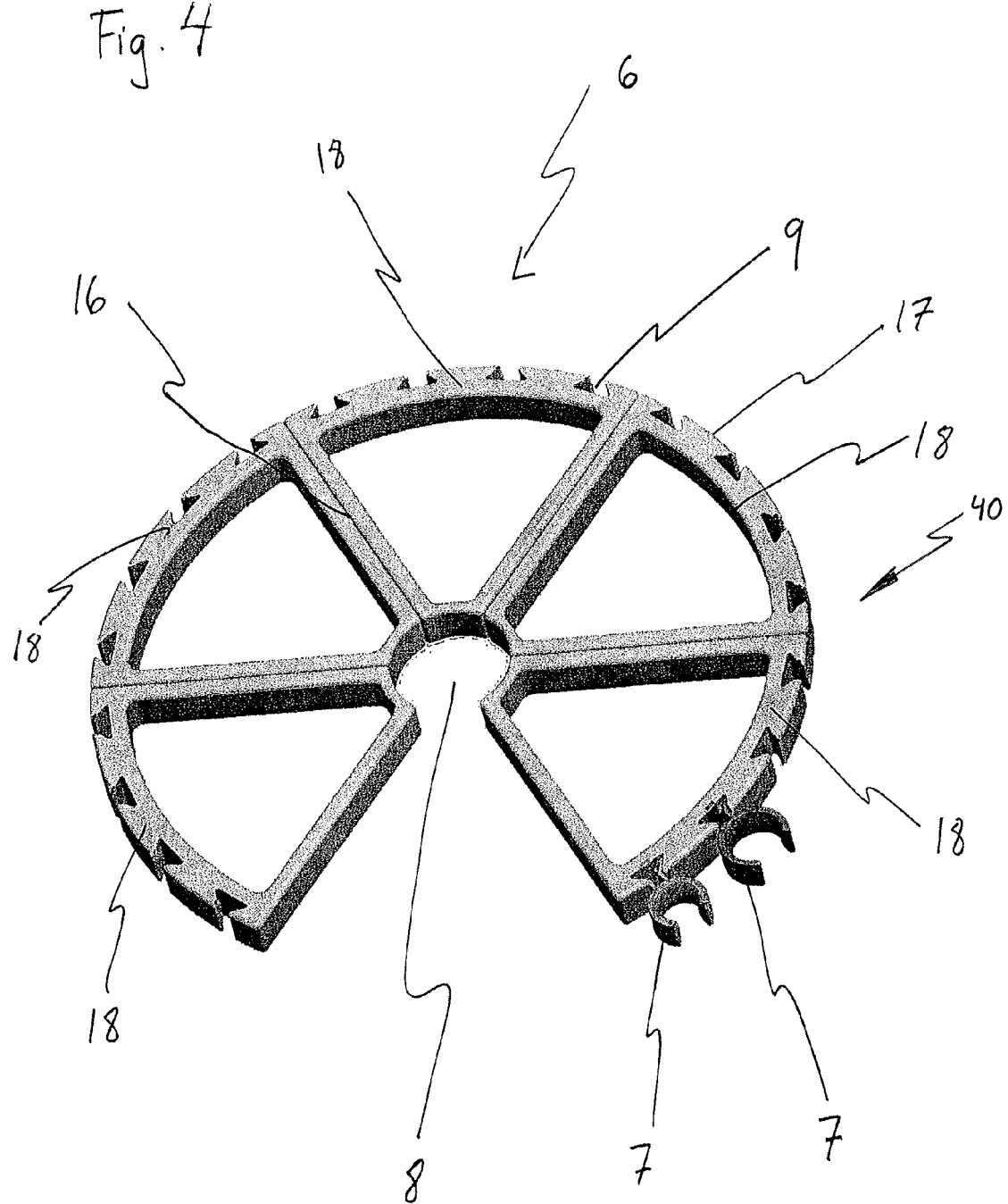

ARRANGEMENT FOR CABLE GUIDING AND A WIND TURBINE USING SUCH ARRANGEMENT

TECHNICAL FIELD

The present invention generally relates to an arrangement for cable guiding in a wind turbine tower. The arrangement is adapted to provide sufficient shielding of e.g. a high voltage cable, and facilitate turning or twisting of the cables due to the turning of the nacelle of the wind turbine. The arrangement, comprising a guide member, is adapted to guide a first cable and at least one second cable, extending from the nacelle of the wind turbine to the ground through the interior space of the tower, along an upper section of the tower. The present invention further relates to a wind turbine comprising such an arrangement and to use of such an arrangement.

BACKGROUND OF THE INVENTION

A wind turbine generally comprises a tower, a nacelle, at least one blade and a yaw bearing arranged between the tower and the nacelle. A high voltage cable is drawn from a generator arranged in the nacelle, down to the ground through the interior space of the tower. Generally, the cable has a diameter of 60-110 mm. This high voltage cable is not the only cable extending from the nacelle through the interior of the tower, but also other additional cables, such as signal cables or the like, are extending in the same manner through the tower. Normally, these cables are mounted on the outer surface of the high voltage cable. To avoid disturbances from the high voltage cable, the latter must be provided with an outer shielding, thereby increasing its thickness, weight and cost.

In operation, the nacelle is turned around the yaw bearing in order for the blades to be correctly oriented towards the wind. This turning is transferred to the cables, thereby twisting or turning the same. In order to allow for this twisting, the cables must have a free length, which is hanging centrally through the upper section of the tower. Along the lower sections of the tower, the cables are fixed to the inner wall of the tower. Along the wall, the additional cables and the high voltage cable are separated. Thus, the twisting is generally restricted to the free length of the cables along the upper section of the tower only.

Normally, the nacelle is allowed to be turned about five turns before it must be re-turned to its original position in order to avoid any damages to the cables.

Due to the extra shielding of the high voltage cable, which is required for avoiding disturbances on the additional cables arranged in the tower, the high voltage cable becomes expensive and heavy.

Additionally, all cables must be made with an extra length in order to allow for the twisting due to the turning of the nacelle, which additionally adds to the weight and cost of the cables.

SUMMARY OF THE INVENTION

In view of the above, an objective of the invention is to provide an improvement over the above described techniques and prior art.

In particular, an objective is to reduce the weight and cost of the high voltage cable.

Another objective is to reduce the need for outer shielding arranged around the high voltage cable.

Another objective is to facilitate twisting or turning of the cables along the upper section of the tower as a result of the turning of the nacelle.

According to a first aspect, the present invention is realized by an arrangement for cable guiding, comprising a first guide member adapted to enclose a first cable along at least a part of the length of said first cable, said first guide member having an outside surface adapted to form at least one first guide surface supporting at least one second cable along at least a part of the length of said first cable.

An advantage is that the first cable is separated from the at least one second cable by means of the first guide member. The first cable is arranged on the inside of the first guide member, while the at least one second cable is arranged on the outside of the first guide member. The first cable may be a high voltage cable, or the like, and the at least one second cable may be any additional cable such as a signal cable, or the like.

Another advantage is that the need for outer shielding at the first cable is reduced, due to the separation of the first cable and the at least one second cable. Instead of using outer shielding of the first cable, the first guide member ensures that the at least one second cable is arranged at a predetermined distance from the first cable such that sufficient shielding is achieved. The shielding is provided by a combination of air and material in the first guide member. Also, the weight and the cost of the first cable can be reduced.

A further advantage is that since the at least one second cable is not attached to the first cable, the first cable is independently and freely arranged in view of the at least one second cable, and vice versa. Consequently, the first cable may turn or twist without turning or twisting the at least one second cable. Accordingly, when the nacelle is turned around the yaw bearing, the first cable and the at least one second cable are not necessarily turned to the same extent.

The first guide member encloses the first cable along at least a part of the length of said first cable. The first guide member does not have to completely surround the first cable circumferentially, but at least a portion of the first cable is enclosed by the first guide member.

Said first cable and said at least one second cable may be allowed to turn independently of each other. The first guide member may not be attached to the first cable. The turning of one cable is not transferred to the other cables. Consequently, the turning of the cables due to the turning of the nacelle is facilitated and the risk for entanglement is reduced.

Said first guide member may comprise at least one supporting element forming a distance between the first guide surface and the first cable. The supporting element ensures that a sufficient distance is maintained between the first cable and the first guide surface, and thereby between the first cable and the at least one second cable supported by the first guide surface. The distance between the first cable and the at least one second cable forms a shielding between the cables. Accordingly, depending of the design of the first guide member, the shielding may be formed either by a combination of air and material in the first guide member, or by material in the first guide member alone.

The first guide member may be a disc. The disk shape allows the inner periphery of the disk to enclose the first cable and the outer periphery of the disk forms the first guide surface supporting the at least one second cable. Forming the first guide member as a disc is material saving and reduces the weight of the arrangement. The first guide member may also be formed of a plurality of discs arranged along a longitudinal portion of the first cable.

Said at least one first guide surface may be a clip arranged on an outer periphery of the first guide member. The clip is adapted to removably attach the at least one second cable to the first guide member such that it is attached to the first guide member. Using a clip is an easy way to removably attach the at least one second cable to the first guide member. If more than one second cable is provided, one clip may be arranged on the first guide member for each second cable.

Said at least one supporting element may be a spoke. The extension of the spoke in the radial direction forms the distance required for the shielding of the first cable.

The first guide member may be a first tubular housing extending along at least a part of the length of the first cable, said first guide surface being formed by the envelope surface of the first tubular housing. In this embodiment, the first cable is enclosed by the first tubular housing and the envelope surface of the first tubular housing forms the first guide surface supporting the at least one second cable. The first cable may be freely arranged inside the first tubular housing. The first cable and the at least one second cable are separated along the entire extension of the first tubular housing, thus hindering contact between the first and the at least one second cable. The radial distance between the first cable arranged inside the first tubular housing and the envelope surface supporting the at least one second cable provides the necessary shielding.

Said first cable and said at least one second cable may be allowed to turn independently of each other in view of said first guide member. The first cable may be allowed to turn, or twist, inside the first tubular housing, independently of both the at least one second cable and the first tubular housing. Further, the at least one second cable is allowed to turn independently of both the first cable and the first tubular housing on the envelope surface of the first tubular housing.

Said at least one second cable may be arranged to extend from an upper end of said first tubular housing along the first guide surface via a pulley system and further to an electrical connection. The at least one second cable is in this way guided along the vertical extension of the first guide surface, and then directed to the inner wall of tower via the pulley system. After having passed the pulley system, the at least one second cable extends along the inner wall of the tower.

The pulley system may comprise a pulley being moveable between a first and a second position for controlling the free length of the at least one second cable. By controlling the free length of the at least one second cable, the risk is reduced that the twisting of the cables results in the cables get entangled. When the at least one second cable unwinds, the pulley system is adapted to control the free length of the at least one second cable, i.e. to control the slack.

The pulley may be moveable along a slot. By the pulley being movable between different positions, it is possible to control the free length of the at least one second cable, such that entanglement is avoided.

Said pulley may be moveable between the first and second position when turning said at least one second cable in view of the first guide member. When the nacelle turns, the at least one second cable is wound on the envelope surface of the first tubular housing. During the winding the pulley moves to a second position, compensating the reduced free length of the at least one second cable. When the at least one second cable unwinds, the pulley moves back to the first position in order to compensate for the now increased free length of the at least one second cable.

The pulley system may comprise a plurality of pulleys.

The pulley system may be attached to a fixed surface being independent of the arrangement. For example, the pulley system may be attached to the inner wall of the tower.

The arrangement may further comprise a second guide member having an outside surface adapted to form at least one second guide surface supporting the at least one second cable. Thereby, the first and the at least one second cable are further separated such that risk for entanglement is further reduced.

The first guide member may be a first tubular housing extending along at least a part of the length of said first cable, said first guide surface being formed by the envelope surface of the first tubular housing, and the second guide member may be a second tubular housing, said second guide surface being formed by the envelope surface of the second tubular housing. The at least one second cable is guided from the first tubular housing to the second tubular housing, and may be winded around the envelope surface of both the first and the second housings.

The first and the second guide members may be adapted to turn synchronously. Thereby, any slack may be compensated by the at least one second cable winds around one of the guide members. If the at least one second cable unwinds from the first tubular housing, the at least one second starts to wind around the second tubular housing, and vice versa.

A first part of said at least one second cable may be extending along the first guide member and a second part of said at least one second cable may be extending along the second guide member.

According to another aspect of the invention, a wind turbine comprising the above described arrangement is provided. The above described advantages are applicable also for a wind turbine comprising said arrangement. For example, said arrangement provides a guide surface for the at least one second cable, thus avoiding entanglement of the cables, and the guide member provides shielding between the first cable and the at least one second cable allowing a cheaper quality of the first cable.

The arrangement may be arranged in the upper part of the tower adjacent the nacelle. The first cable and the at least one second cable extend from the nacelle to the ground. Cable guidance is primarily needed in the upper part of the tower due to the turning of the nacelle. In the lower part of the tower, the at least one second cable is fixed to the wall of the tower.

The pulley system may be fixed to the wall of the tower. Thereby, the pulley system is independent of the arrangement.

According to a further aspect of the invention, use of the above described arrangement in a wind turbine is claimed. The above described advantages are applicable also for the use of said arrangement in a wind turbine.

Other objectives, features and advantages of the present invention will appear from the following detailed disclosure, from the attached claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein:

FIG. 1b schematically illustrates the arrangement illustrated in FIG. 1a when the nacelle has turned.

FIG. 3 schematically illustrates the arrangement according to a third embodiment of the present invention.

FIG. 4 schematically illustrates an alternative embodiment of a first guide member.

DETAILED DESCRIPTION OF PREFERRED EMBODIMENTS

Figure 1A:
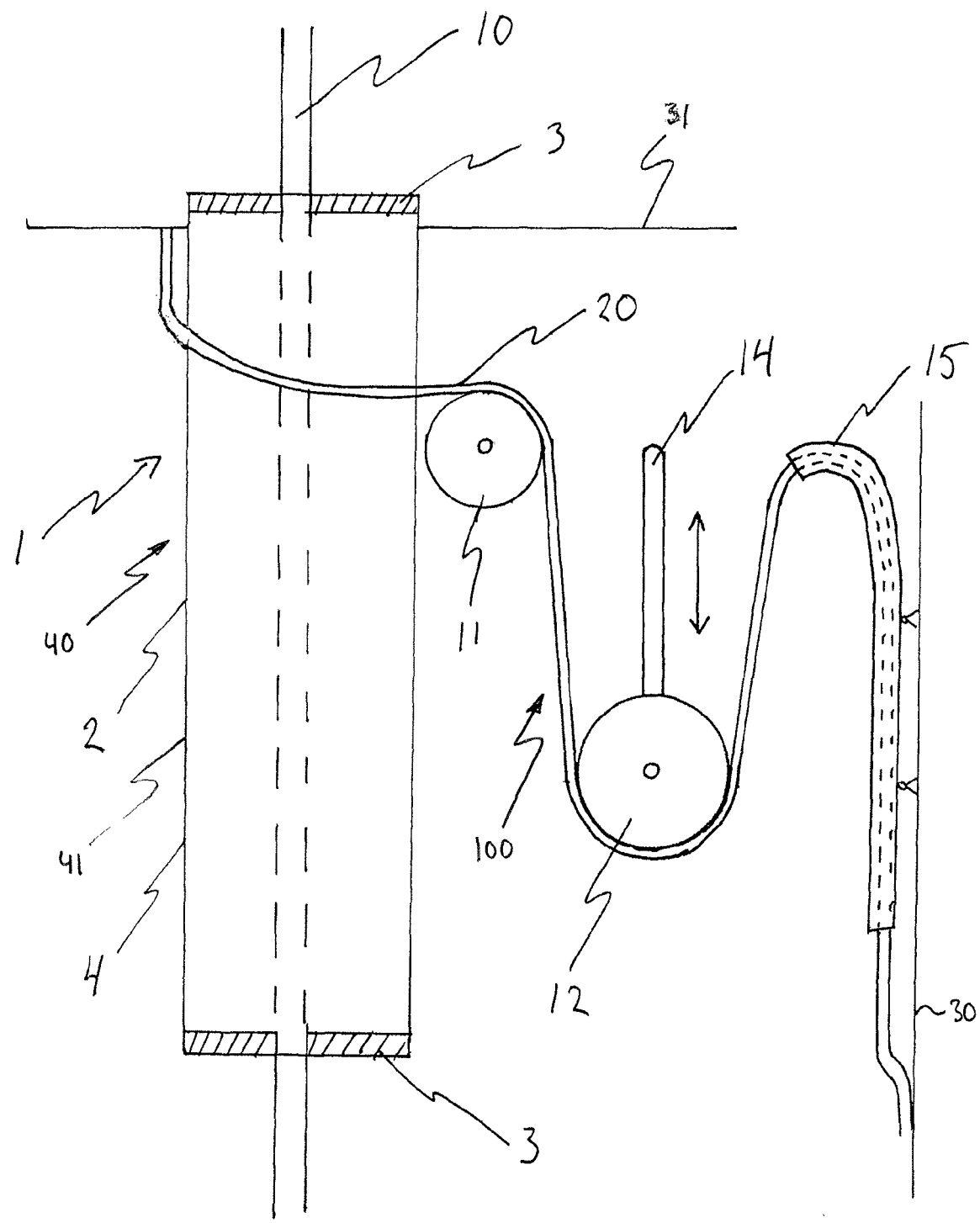
FIG. 1a schematically illustrates an arrangement according to a first embodiment of the present invention.

With reference to FIGS. 1a and 1b, an arrangement 1 according to a first embodiment of the invention will be described. The arrangement 1 is arranged in an upper section 31 of a wind turbine tower 30. The tower 30 is extending from the ground to a nacelle of the wind tower. A first cable 10, such as a high voltage cable, is extending from the nacelle towards the ground through the tower 30 in a vertical direction. At least one second cable 20 is also extending from the nacelle to the ground. The at least one second cable 20 may be a signal cable, or any other cable arranged in the tower 30.

The arrangement 1 comprises a first guide member 40, in this embodiment in the form of a first tubular housing 2. The first tubular housing 2 extends inside a part of the tower 30 in a vertical direction.

The first tubular housing 2 encloses the first cable 10. The first tubular housing 2 is provided with supporting elements 3 ensuring that a radial distance is formed between the envelope surface 4 of the first tubular housing 2 and the first cable 10. The distance between the envelope surface 4 and the first cable 10 must be sufficient large for achieving the desired shielding of the first cable 10. Also, said supporting elements 3 may be used as a connection between the tower and the first guide member 40.

The at least one second cable 20 (only one second cable is disclosed in FIGS. 1a, 1b, 2, 3 and 4) is extending along an upper portion of the envelope surface 4 of the first tubular housing 2. In the lower end of the envelope surface, the at least one second cable 20 is guided via a first pulley 11, a second pulley 12, and a cable tray 15 and further down to an electrical connection (not shown), well known in the art.

The first pulley 11 is arranged at a distance from the first tubular housing 2 and guides the at least one second cable 20 towards the second pulley 12. The first pulley 11 may be turnable about its axis, or may be fixedly arranged.

The second pulley 12 is moveably arranged in a vertical slot 14, thus allowing vertical movement of the second pulley 12 between a first and second position. After passing the second pulley 12, the at least one second cable 20 is guided towards the cable tray 15. The cable tray 15 is adapted to guide the at least one second cable 20 along at least a portion of the inner wall of the tower 30 towards the ground, and to a not disclosed electrical connection well known in the art. The cable tray 15 may be fixedly arranged to the inner wall of the tower 30. It is to be understood that the cable tray alternatively can be formed by a fixedly mounted pulley.

The second pulley 12 is adapted to compensate for any slack by moving along the vertical direction. The turning of the nacelle results in winding of the at least one second cable around the envelope surface 4 of the first tubular housing 2, which will be described in more detail with reference to FIG. 1b. Consequently, the second pulley 12 moves from a first position towards a second position when the at least one second cable 20 winds around the envelope surface of the first tubular housing 2. When the at least one second cable 20 unwinds, the second pulley 12 moves in the vertical direction along the slot 14 towards the first position for compensating for any slack of the at least one second cable 20.

The first pulley 11, the second pulley 12 and the cable tray 15 may be orientated with an angle in relation to each other.

After having passed through the first tubular housing 2, the first cable 10 is directed towards the wall of the tower 30 and extends along the inner wall of the tower towards the ground. Once meeting the inner wall of the tower 30, all cables can be separated along the inner envelope wall surface of the tower, thus eliminating any need of shielding in that area.

FIG. 1b illustrates the arrangement as shown in FIG. 1a, but the nacelle has turned around the tower 30 a number of turns in view of the situation illustrated in FIG. 1a. During turning of the nacelle, the first cable 10 is allowed to turn freely inside the first tubular housing 2. When the nacelle is turning, the at least one second cable 20 starts to wind around the envelope surface of the first tubular housing 2. The envelope surface 4 of the first tubular housing 2 thus provides a first guide surface (41) supporting the at least one second cable 20 along the first tubular housing 2. As the nacelle turns more, the at least one second cable 20 continues to turn around the envelope surface 4, forming a helical pattern. When the nacelle turns back, the at least one second cable 20 unwinds and the second pulley 12 is adapted to compensate for any slack by moving upwards along the vertical direction.

The second pulley 12 is moveably arranged in the slot and is moveable in a vertical direction between the first position and second position. The second pulley 12 is in its first position, see FIG. 1a, before the winding of the at least one second cable 20 has initiated. When the at least one second cable 20 winds around the first tubular housing 2, the second pulley 12 moves towards its second position, see FIG. 1b. If the at least one second cable 20 unwinds, the second pulley 12 moves back to its first position for controlling the free length of the at least one second cable 20 and reducing the slack of the at least one second cable 20. The second pulley 12 may be spring-loaded, such that it is adapted to return to the first position when not being loaded.

Figure 2:
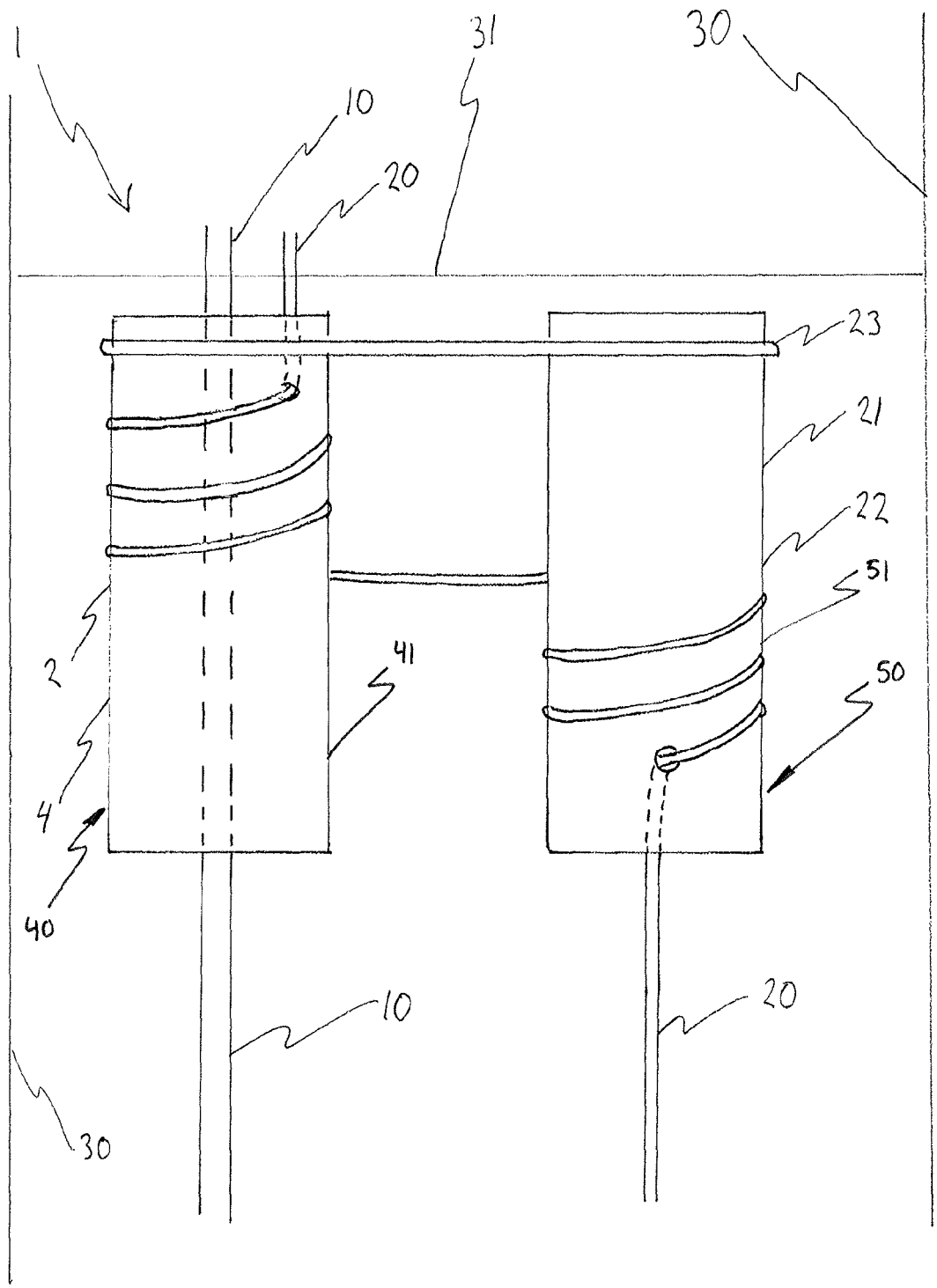
FIG. 2 schematically illustrates a second embodiment of the present invention.

FIG. 2 discloses a second embodiment of the arrangement 1. In this embodiment, the arrangement 1, arranged in the tower as previously described, comprises the first guide member 40 and a second guide member 50. The first guide member 40 is in form of the first tubular housing 2. The tubular housing 2 encloses the first cable 10, and the at least one second cable 10 is extending along the upper portion of envelope surface 4 of the first tubular housing 2, as previously disclosed with reference to FIGS. 1a and 1b.

The second guide member 50 is in form of a second tubular housing 21. The second tubular housing 21 is arranged adjacent the first tubular housing 2 in the upper section 31 of the wind turbine tower 30 and is extending in the vertical direction. The envelope surface 22 of the second tubular housing 21 forms a second guide surface 51. The first and the second tubular housings 2, 21 are interconnected by a mechanical coupling device 23, such that the first and the second tubular housings 2, 21 turn synchronously and in the same direction when the nacelle turns.

In the second embodiment, the first cable 10 is extending inside the first tubular housing 2 as previously described. The at least one second cable 20 is extending, in a helical pattern, along an upper portion of the envelope surface 4 of the first tubular housing 10. The at least one second cable 20 is then guided towards the second tubular housing 21.

After being guided towards the second tubular housing 21, the at least one second cable 20 is extending, in a helical pattern, along a lower portion of the envelope surface 22. In the lowermost portion of the tubular housing 21, the at least one second cable 20 is introduced into the second tubular housing 21. Thereby, in the lowermost portion of the second tubular housing 21, the second tubular housing 21 encloses the at least one second cable 20.

As the first and the second tubular housings 2, 21 are interconnected by the mechanical coupling device 23, they turn synchronously when the nacelle turns. Thereby, when the nacelle turns in a first direction, the at least one second cable 20 winds around the envelope surface 4 of the first tubular housing 2, forming a helical pattern, and, simultaneously, the at least one second cable 20 unwinds from the envelope surface 22 of the second tubular housing 21. When the nacelle turns back, the at least second one cable 20 unwinds from the second tubular housing 21, and, simultaneously, the at least second one cable 20 winds around the envelope surface 4 of the first tubular housing 2, forming a helical pattern, in order to compensate for the slack. Thereby, the winding of the at least one second cable 20 around one of the guide members 40, 50, and the corresponding unwinding of the at least one second cable 20 from the other guide member 40, 50, compensate for any slack of the at least one second cable 20.

With reference to FIG. 3 and FIG. 4, a third embodiment of the present invention will be described. The arrangement 1 according to this embodiment comprises a first guide member 40 in form of a number of discs 6. A single disc 6 will be described in more detail with reference to FIG. 4. Preferably, a plurality of discs 6 forms the first guide member 40.

The first guide member 40 encloses the first cable 10. The first guide member 40 is adapted to receive the first cable 10 through a central portion 8 of the first guide member 40. The distance between the central portion 8 of the first guide member 40 and the outer periphery 17 of the first guide member 40 ensures shielding of the first cable 10. Thus, the shielding is achieved by a combination of air and material in the first guide member 40.

The outer periphery 17 of the first guide member 40 is provided with recesses 9 adapted to receive a number of clips 7. In the shown embodiment, the first guide member 40 comprises a plurality of recesses 9 arranged at different positions. The clip 7 is received in the recess 9 of the first guide member 40 and secured by a fastening means. The at least one second cable 20 is supported by and removably attached to the clip 7. By arranging a plurality of clips 7 on the first guide member 40, more than one second cable 20 may be attached to the first guide member 40.

Alternatively, the clip 7 is integral with the first guide member 40. Preferably, the first guide member 40 and the clip 7 are injection-moulded. This applies no matter if the first guide member 40 and the clip are integrated or separate parts.

When the nacelle turns, the first cable 10 turns freely inside the central portion of the first guide member 40. The at least one second cable 20 twists as a response to the turning of the nacelle, forming a helical pattern. More precisely, the helical pattern is formed by the at least one second cable 20 turning the first guide member 40 around the first cable 10. The first guide member 40 may turn in view of the first cable 10, as the first cable 10 is not fixedly attached to the first guide member 40. Further, as the first cable 10 is not fixedly arranged to the first guide member 40, the individual first guide members 40 are moveable along the first cable 10 in the vertical direction, reducing/increasing the slack of the at least one second cable 20. The more the at least one second cable 20 turns, the more the distance between two adjacent first guide members 40 will decrease as a consequence of the turning of the at least one second cable 20.

As only the at least one second cable 20 is attached to the first guide member 40, the first cable 10 and the at least one second cable 20 are allowed to turn or twist independently of each other.

After having passed the lowermost first guide member 40, the first and the at least one second cables 10, 20 are directed towards and attached to the inner envelope wall surface of the tower 30 and extends along the inner envelope wall surface towards the ground. When the first and the at least one second cables 10, 20 are guided along the inner envelope wall surface, they can be separated along the surface. Thus, the need for shielding in that area of the tower is eliminated.

Now referring to FIG. 4, the first guide member 40 in form of the disc 6 will be described in more detail. The disc 6 comprises a circular central portion 8 defining a space adapted to accommodate the first cable 10. The disc 6 extends in a radial direction essentially perpendicular to the vertical direction of the first cable 10. One or more spokes 16 are extending in the radial direction of the disc 6. The spokes 16 connect the central portion 8 with the outer periphery 17 of the disc 6. The spokes 16 form a distance between the first cable 10 adapted to be freely arranged in the central portion 8 and the at least one second cable 20, adapted to be arranged on the outer periphery 17 of the disc 6 by means of the clips 7. Consequently, shielding of the first cable 10 is obtained.

The disc illustrated in FIG. 4 is formed of five circular segments 18. By having an open portion of the disc 6, it is possible to introduce the first cable 10 to the central portion 8 of the disc 6. The radius of the central portion 8 may be equal, or preferably larger, than the radius of the first cable 10, such that free turning of the first cable 10, independently of the disc 6, is allowed as the nacelle turns.

The invention has mainly been described above with reference to a few embodiments. However, as is readily appreciated by a person skilled in the art, other embodiments than the ones disclosed above are equally possible within the scope of the invention, as defined by the appended claims.

For example, it is contemplated that more than one cable may be enclosed by the first guide member. Also, it is contemplated that the design of the disc can be different from that disclosed as long as the radial distance between the first cable and the at least one second cable can be ensured while said cables are allowed to turn independent of each other.

The invention claimed is:

1. An arrangement for cable guiding in a wind turbine having a nacelle rotatably supported on a tower, the arrangement comprising:
   a first cable and at least one second cable configured to extend from the nacelle into the tower;
   a first guide member adapted to enclose said first cable along at least a part of the length of said first cable, said first guide member having an outside surface forming at least one first guide surface supporting said at least one second cable along at least a part of the length of said first cable;
   wherein the first guide member is a first tubular housing extending along at least a part of the length of said first cable, said first guide surface being formed by an envelope surface of the first tubular housing.

2. The arrangement according to claim 1, wherein said first cable and said at least one second cable are configured to turn independently of each other.

3. The arrangement according to claim 1, wherein said first guide member comprises at least one supporting element forming a distance between the first guide surface and the first cable.

4. The arrangement according to claim 1, further comprising:
a pulley system, wherein said at least one second cable is arranged to extend from an upper end of said first tubular housing to said pulley system.

5. The arrangement according to claim 4, wherein the pulley system comprises a pulley moveable between a first and a second position for controlling a free length of the at least one second cable.

6. The arrangement according claim 5, wherein the pulley system comprises a plurality of pulleys.

7. The arrangement according to claim 1, further comprising a second guide member having an outside surface forming at least one second guide surface supporting the at least one second cable.

8. The arrangement according to claim 7, wherein
the second guide member is a second tubular housing, said second guide surface being formed by the envelope surface of the second tubular housing.

9. The arrangement according to claim 8, wherein the first and the second guide members are adapted to turn synchronously.

10. The arrangement according to claim 8, wherein a first part of said at least one second cable extends along the first guide member and a second part of said at least one second cable extends along the second guide member.

11. A wind turbine comprising:
a tower;
a nacelle rotatably supported on the tower; and
an arrangement for guiding cables, the arrangement comprising:
a first cable and at least one second cable extending from the nacelle into the tower; and
a first guide member enclosing the first cable along at least a part of the length of the first cable, the first guide member having an outside surface forming at least one first guide surface supporting the at least one second cable along at least a part of the length of the first cable;
wherein the first guide member is a first tubular housing extending along at least a part of the length of said first cable, the first guide surface being formed by an envelope surface of the first tubular housing.

12. The wind turbine according to claim 11, wherein said arrangement is arranged in an upper part of the tower adjacent the nacelle.

13. The wind turbine according to claim 11, further comprising:
a pulley system is fixed to the tower, wherein said at least one second cable extends from an upper end of said first tubular housing to said pulley system and then further down the tower.

14. The wind turbine according to claim 13, wherein the pulley system comprises a pulley moveable between a first and a second position for controlling a free length of the at least one second cable.

15. The wind turbine according to claim 14, wherein the pulley is moveable along a slot in the tower.

16. The wind turbine according to claim 14, wherein the pulley system further comprises a plurality of pulleys.

17. The wind turbine according to claim 11, further comprising a second guide member having an outside surface forming at least one second guide surface supporting the at least one second cable.

18. The wind turbine according to claim 17, wherein the second guide member is a second tubular housing, said second guide surface being formed by the envelope surface of the second tubular housing.

19. The wind turbine according to claim 18, wherein the first and the second guide members are adapted to turn synchronously.

20. The wind turbine according to claim 18, wherein a first part of said at least one second cable extends along the first guide member and a second part of said at least one second cable extends along the second guide member.

* * * * *